(12) United States Patent
Lin et al.

(10) Patent No.: US 10,878,157 B2
(45) Date of Patent: Dec. 29, 2020

(54) VARIANT CELL HEIGHT INTEGRATED CIRCUIT DESIGN

(71) Applicant: Taiwan Semiconductor Manufacturing Company, Ltd., Hsinchu (TW)

(72) Inventors: Yen-Hung Lin, Hsinchu (TW); Chung-Hsing Wang, Hsinchu (TW); Yuan-Te Hou, Hsinchu (TW)

(73) Assignee: TAIWAN SEMICONDUCTOR MANUFACTURING COMPANY, LTD.

( * ) Notice: Subject to any disclaimer, the term of this patent is extended or adjusted under 35 U.S.C. 154(b) by 82 days.

(21) Appl. No.: 15/908,785

(22) Filed: Feb. 28, 2018

(65) Prior Publication Data

US 2019/0147133 A1 May 16, 2019

Related U.S. Application Data

(60) Provisional application No. 62/586,541, filed on Nov. 15, 2017.

(51) Int. Cl.
| | | |
|---|---|---|
| *G06F 17/50* | (2006.01) | |
| *H01L 27/00* | (2006.01) | |
| *G06F 30/392* | (2020.01) | |
| *G06F 30/39* | (2020.01) | |
| *G06F 30/398* | (2020.01) | |
| *H01L 27/02* | (2006.01) | |
| *G06F 30/327* | (2020.01) | |
| *G06F 111/04* | (2020.01) | |
| *G06F 111/20* | (2020.01) | |
| *G06F 30/30* | (2020.01) | |
| *G06F 119/06* | (2020.01) | |
| *G06F 119/12* | (2020.01) | |

(52) U.S. Cl.
CPC ............ *G06F 30/392* (2020.01); *G06F 30/39* (2020.01); *G06F 30/398* (2020.01); *H01L 27/0207* (2013.01); *G06F 30/30* (2020.01); *G06F 30/327* (2020.01); *G06F 2111/04* (2020.01); *G06F 2111/20* (2020.01); *G06F 2119/06* (2020.01); *G06F 2119/12* (2020.01)

(58) Field of Classification Search
None
See application file for complete search history.

(56) References Cited

U.S. PATENT DOCUMENTS 5,852,562 A * 12/1998 Shinomiya .............. G06F 30/39
716/139
5,892,678 A * 4/1999 Tokunoh .................. G06F 30/30
716/102
(Continued)

OTHER PUBLICATIONS

S. Dobre et al., "Mixed Cell-Height Implementation for Improved Design Quality in Advanced Nodes," 2015 IEEE, pp. 854-860. (Year: 2015).*

*Primary Examiner* — Leigh M Garbowski
(74) *Attorney, Agent, or Firm* — Merchant & Gould P.C.

(57) ABSTRACT

An integrated circuit that includes a first row having a first height, with a first cell in the first row that has the first height. The integrated circuit further includes a second row having a second height, where the first height is not an integer multiple of the second height. A second cell is in the second row that has the second height.

20 Claims, 7 Drawing Sheets

(56) References Cited

U.S. PATENT DOCUMENTS

| | | | |
|---|---|---|---|
| 6,336,207 B2* | 1/2002 | Shinomiya | G06F 30/39 716/122 |
| 7,003,738 B2* | 2/2006 | Bhattacharya | G06F 30/39 716/102 |
| 7,039,881 B2* | 5/2006 | Regan | H01L 27/0207 716/103 |
| RE39,469 E* | 1/2007 | Fudanuki | H03K 19/1735 326/101 |
| 7,299,440 B2 | 11/2007 | Yoshida et al. | |
| 7,302,660 B2* | 11/2007 | Shimamura | H01L 27/11807 257/206 |
| 7,360,198 B2* | 4/2008 | Rana | G06F 30/30 716/102 |
| 7,802,219 B2* | 9/2010 | Tomar | G06F 30/392 716/119 |
| 8,495,534 B2* | 7/2013 | Alpert | G06F 30/392 716/106 |
| 8,631,377 B2 | 1/2014 | Lee et al. | |
| 8,788,998 B2* | 7/2014 | Hatamian | G06F 30/392 716/122 |
| 8,847,327 B2* | 9/2014 | Kato | H01L 27/088 257/401 |
| 8,943,455 B2 | 1/2015 | Chen et al. | |
| 9,007,095 B2* | 4/2015 | Penzes | H01L 27/11807 326/101 |
| 9,165,102 B1* | 10/2015 | Macdonald | H01L 23/528 |
| 9,449,136 B2* | 9/2016 | Pan | G06F 30/39 |
| 9,501,600 B2* | 11/2016 | Hsieh | G06F 30/39 |
| 10,380,306 B2* | 8/2019 | Hsieh | G06F 30/39 |
| 2017/0256446 A1* | 9/2017 | Cha | H01L 21/76838 |

* cited by examiner

FIG. 11

VARIANT CELL HEIGHT INTEGRATED CIRCUIT DESIGN

CROSS-REFERENCE TO RELATED APPLICATION

This application claims the benefit of U.S. Provisional Patent Application No. 62/586,541, filed on Nov. 15, 2017, the entire contents of which is incorporated by reference.

BACKGROUND

Various automated tools are employed to assist semiconductor designers in taking a functional design of a desired circuit to a finished layout of the circuit ready to be manufactured. This process converts the functional description of the circuit into Boolean functions that are mapped into rows of cells using a standard cell library. Once mapped, a synthesis is performed to turn the structural design into a physical layout.

To avoid problems with aligning the cells from the library with common power rails or other design rules, standardized cells from a cell library are used which have a cell height equal to the height of the cell row or a cell height that is a multiple of the standard cell height. As such, typically a decision is made early on as to which cell height to utilize for the design, and the cell library corresponding to that cell height is used for the structural design and synthesis processes.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Integrated circuit automated design tools transform a circuit design into a circuit layout to be manufactured. This process typically includes turning a behavioral description of the circuit into a functional description, which is then decomposed into logic functions and mapped into rows of cells using a standard cell library. Once mapped, a synthesis is performed to turn the structural design into a physical layout, a clock tree is built to synchronize the structural elements, and the design is optimized post layout.

According to aspects of the present disclosure, examples of integrated circuits and design processes for generating a gate-level netlist from a user design include generating integrated circuits that include rows of cells that have varying unit-heights. In other words, the rows have varying row heights that are not necessarily multiples of one another.

For example, some embodiments provide an integrated circuit that includes a first row having a first height with cells in the first row that have the first height, and a second row having a second height that is not an integer multiple of the first height. Cells in the second row have the second height. In contrast, some known integrated design methods include only identical row-heights, with each row having a height referred to as $h_{unit}$. The rows contain cells having this row height, or cells having a cell height that is a multiple of $h_{unit}$ (i.e. $n \times h_{unit}$, where n is a positive integer) may be placed into numerous rows that each have the $h_{unit}$ height. This arrangement prevents or hinders optimizing design due to such row constraints.

Using only a single cell height, compromises between circuit performance, circuit power, and the manufacturing process must be made. For example, cells with a low threshold voltage have relatively high speed and power, but may require additional manufacturing steps. Alternatively, cells with a relatively high threshold voltage design may use less power, but also may have lower speed as compared to low threshold voltage cells while still requiring additional manufacturing steps.

Figure 1:
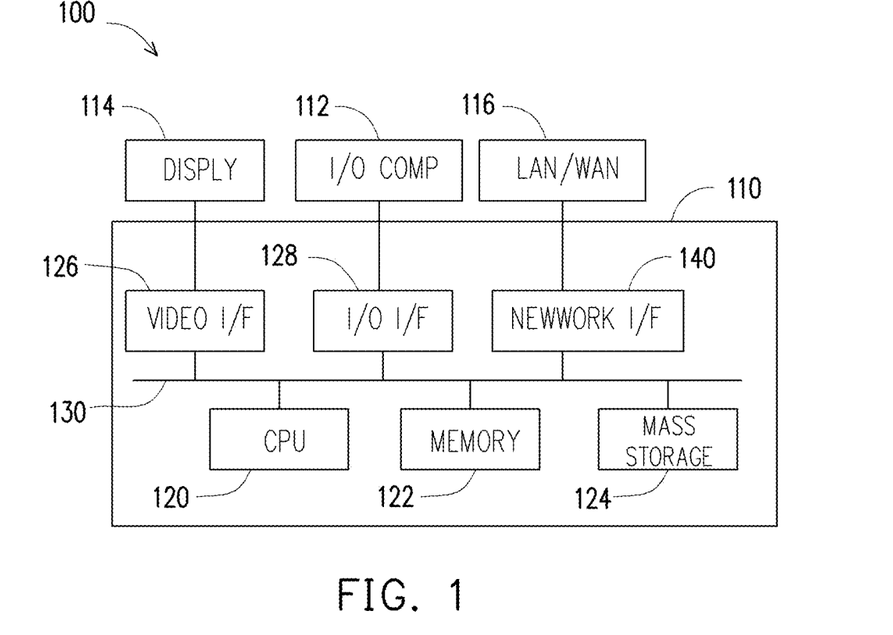
FIG. 1 is a block diagram illustrating aspects of an example processing system in accordance with some embodiments.

FIG. 1 is a block diagram illustrating an example of a processing system 100 in accordance with some embodiments disclosed herein. The processing system 100 may be used to implement various processes discussed herein. The processing system 100 includes a processing unit 110, such as a desktop computer, a workstation, a laptop computer, a dedicated unit customized for a particular application, a smart phone or tablet, etc. The processing system 100 may be equipped with a display 114 and one or more input/output devices 112, such as a mouse, a keyboard, touchscreen, printer, etc. The processing unit 110 also includes a central processing unit (CPU) 120, memory 122, a mass storage device 124, a video adapter 126, and an I/O interface 128 connected to a bus 130.

The bus 130 may be one or more of any type of several bus architectures including a memory bus or memory controller, a peripheral bus, or video bus. The CPU 120 may comprise any type of electronic data processor, and the memory 122 may comprise any type of system memory, such as static random access memory (SRAM), dynamic random access memory (DRAM), or read-only memory (ROM).

The mass storage device 124 may comprise any type of storage device configured to store data, programs, and other information and to make the data, programs, and other information accessible via the bus 130. The mass storage device 124 may comprise, for example, one or more of a hard disk drive, a magnetic disk drive, an optical disk drive, or the like.

The term computer readable media as used herein may include computer storage media such as the system memory and storage devices mentioned above. Computer storage media may include volatile and nonvolatile, removable and non-removable media implemented in any method or technology for storage of information, such as computer readable instructions, data structures, or program modules. The memory 122 and mass storage device 124 are computer storage media examples (e.g., memory storage). Thus, computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the processing device 100. Any such computer storage media may be part of the processing device 100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The video adapter 126 and the I/O interface 128 provide interfaces to couple external input and output devices to the processing unit 110. As illustrated in FIG. 1, examples of input and output devices include the display 114 coupled to the video adapter 126 and the I/O device 112, such as a mouse, keyboard, printer, and the like, coupled to the I/O interface 128. Other devices may be coupled to the processing unit 110, and additional or fewer interface cards may be utilized. For example, a serial interface card (not shown) may be used to provide a serial interface for a printer. The processing unit 110 also may include a network interface 140 that may be a wired link to a local area network (LAN) or a wide area network (WAN) 116 and/or a wireless link.

Embodiments of the processing system 100 may include other components. For example, the processing system 100 may include power supplies, cables, a motherboard, removable storage media, cases, and the like. These other components, although not shown, are considered part of the processing system 100.

In some examples, software code is executed by the CPU 120 to analyze a user design to obtain an integrated circuit layout. The software code may be accessed by the CPU 120 via the bus 130 from the memory 122, mass storage device 124, or the like, or remotely through the network interface 140.

Figure 2:
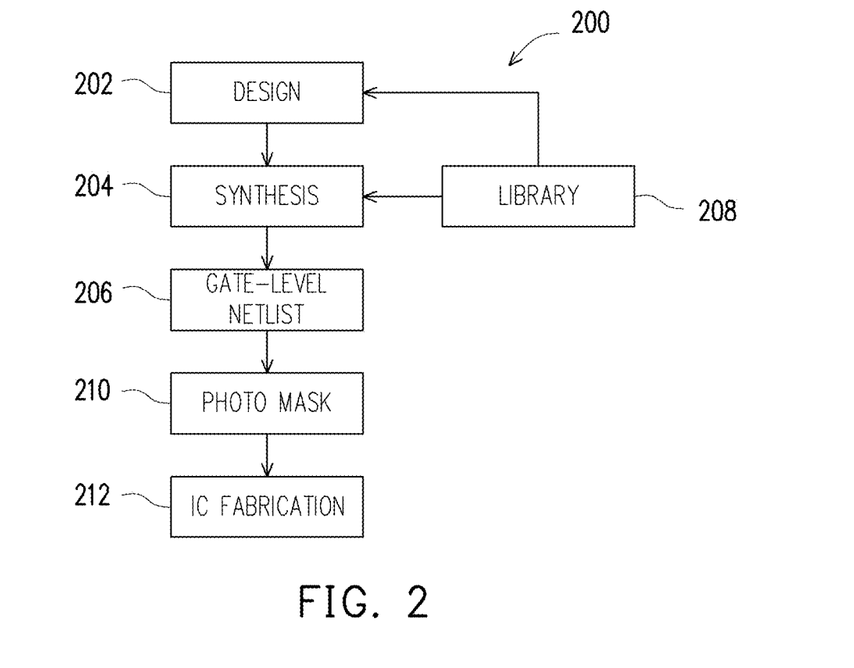
FIG. 2 is process flow diagram illustrating aspects of an example integrated circuit design method in accordance with some embodiments.

FIG. 2 generally illustrates an example integrated circuit design and fabrication process 200 that may be implemented by the processing system 100 for generating a physical layout from a user supplied behavioral/functional design. The user design 202 specifies the desired behavior or function of the circuit based upon various signals or stimuli applied to the inputs of the overall design, and may be written in a suitable programming language. The design 202 may be uploaded into the processing unit 110 (see FIG. 1) through the I/O interface 128 by a user. Alternatively, the design 202 may be uploaded and/or saved on the memory 122 or mass storage device 124, or the design 202 may be uploaded through the network interface 140 from a remote user.

A synthesis 204 is performed on the design, in which the behavior and/or functions desired from the design 202 are transformed to a functionally equivalent logic gate-level circuit description by matching the design to standard cells, such as from one or more cell libraries 208. The cell library 208 contains a listing of pre-designed components, or cells, each of which may perform a discrete logic function. The cells are stored in the cell library 208 as information comprising internal circuit elements, the various connections to these circuit elements, a pre-designed physical layout pattern that includes the unit height of each cell along with the cell's designed power rails, dopant implants, wells, etc. Additionally, the stored cell may also comprise a shape of the cell, terminal positions for external connections, delay characteristics, power consumption, etc. The synthesis 204 results in a functionally equivalent logic gate-level circuit description, such as a gate-level netlist 206. The cell library 208 may be stored, for example, in one or more databases contained in the mass storage 124. Based on the gate-level netlist 206, a photolithographic mask 210 may be generated, which is used to fabricate the integrated circuit 212.

Figure 3:
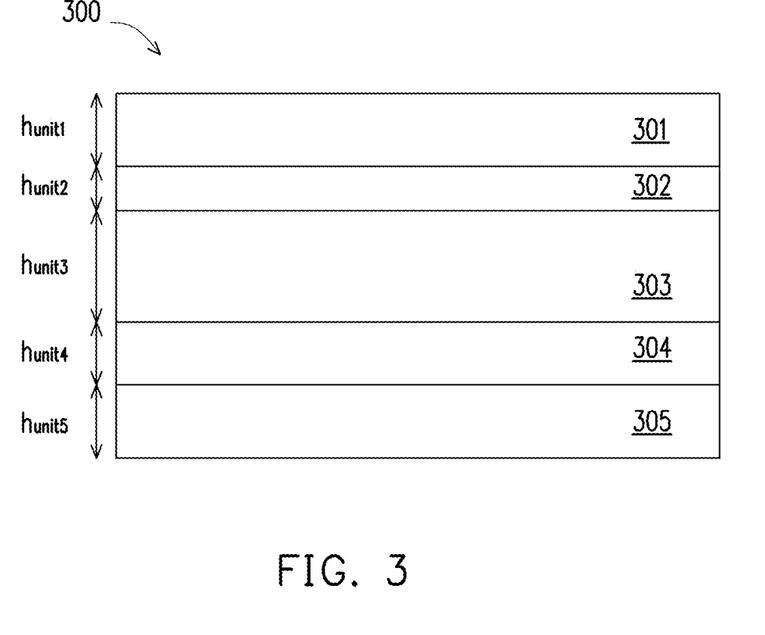
FIG. 3 is a block diagram illustrating aspects of an example integrated circuit floorplan in accordance with some embodiments.

In some examples, a design "floorplan" is determined that includes a plurality of rows with differing row heights. FIG. 3 illustrates an example integrated circuit device floorplan 300 that includes a plurality of rows 301-305, where each of the rows 301-305 has a different unit height $h_{unit1}$-$h_{unit5}$. For example, a first row 301 has a height of $h_{unit1}$, and a second row 302 has a height of $h_{unit2}$, where neither of the row unit-heights $h_{unit1}$,$h_{unit2}$ is a multiple of the other.

Figure 4:
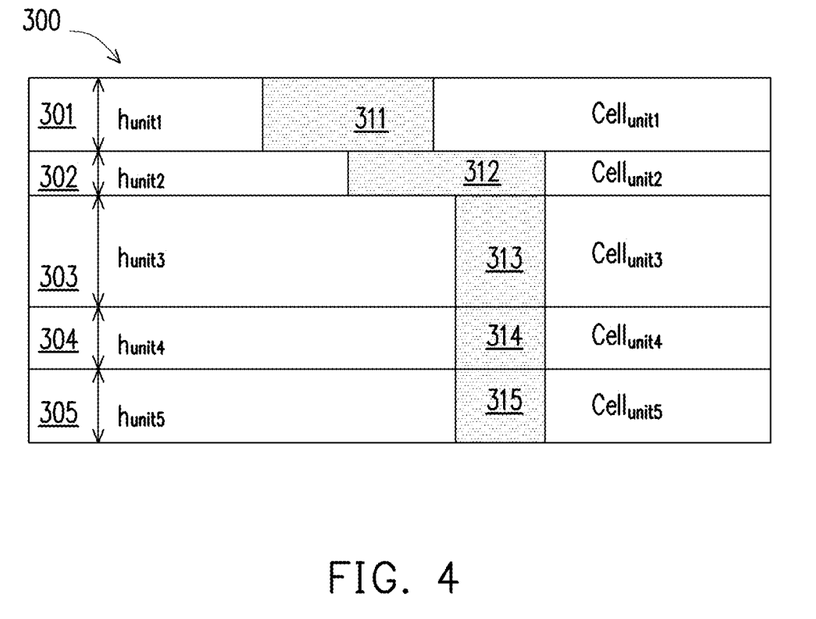
FIG. 4 illustrates the integrated circuit floorplan shown in FIG. 3 further including examples of variant height cells in accordance with some embodiments.

FIG. 4 illustrates the floor plan 300, with a plurality of cells 311-315 located in the rows 301-305. As shown in FIG. 4, the cells 301-305 have unit heights $Cell_{unit1}$-$Cell_{unit5}$ that correspond to the cell unit heights $h_{unit1}$-$h_{unit5}$. In other words, each of the rows 301-305 contains cells 311-315 having the same height. Moreover, in the illustrated example, the rows 301-305 only contain cells 311-315 having the same unit height as the corresponding row. Thus, cell usage is controlled based on row planning in the floorplan 300.

Figure 5:
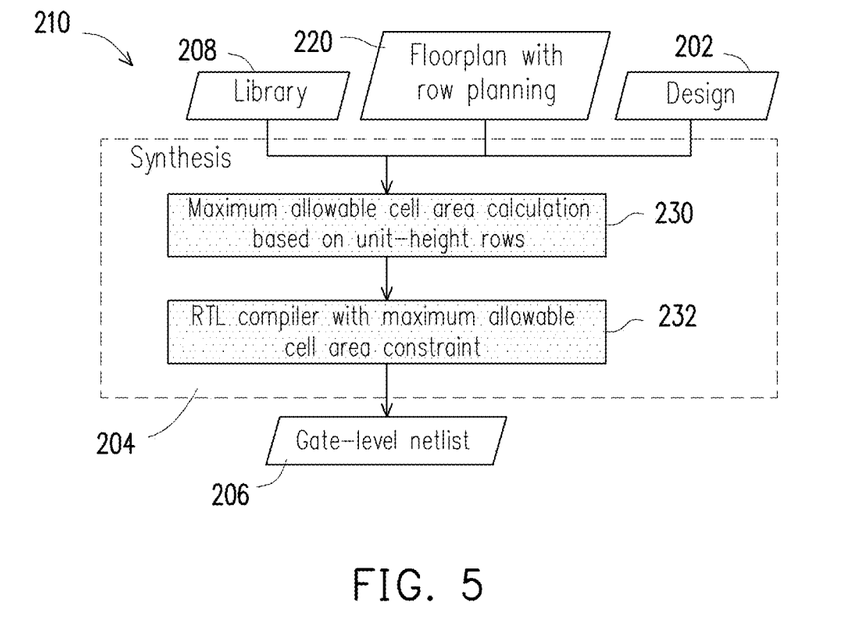
FIG. 5 is a block diagram illustrating further aspects of an integrated circuit design system in accordance with some embodiments.

FIG. 5 is a flow diagram illustrating further aspects of an integrated circuit design process 200 in accordance with disclosed examples. As noted previously, the process 200 may be implemented by the processing device 100 shown in FIG. 1. Referring to FIG. 5, an integrated circuit design 202 is provided, along with a cell library 208 and a floorplan 220 that includes row planning along the lines discussed in conjunction with FIGS. 3 and 4. Thus, the cell library 208 includes cells having varying unit heights, and the floorplan 220 defines rows having various heights along the lines discussed in conjunction with FIGS. 3 and 4.

The synthesis process 204 includes determining a maximum allowable area for the design, and more particularly, includes calculating the maximum allowable area for each cell type. Thus, referring back to the floorplan 300 shown in FIG. 3, the synthesis process includes an operation 230 where a maximum area $Area_{max}$(unit1) for a first cell type $cell_{unit1}$ having a first height $h_{unit1}$ is calculated. This operation is repeated for each of the cell types, so the maximum areas $Area_{max}$(unit1-n) for each cell type $cell_{unit1-n}$ having corresponding unit heights $h_{unit1-n}$ are calculated. Hence, for the particular example shown in FIGS. 3 and 4, the maximum area $Area_{max}$(unit1-5) for each cell type $cell_{unit1-5}$ having corresponding unit heights $h_{unit1-5}$ are calculated.

This calculation 230 is then used by a compiler, such as a register transistor level (RTL) compiler 232, which models a digital circuit in terms of the flow of digital signals between hardware registers, and the logical operations performed on those signals to generate a gate-level netlist 206.

Figure 6:
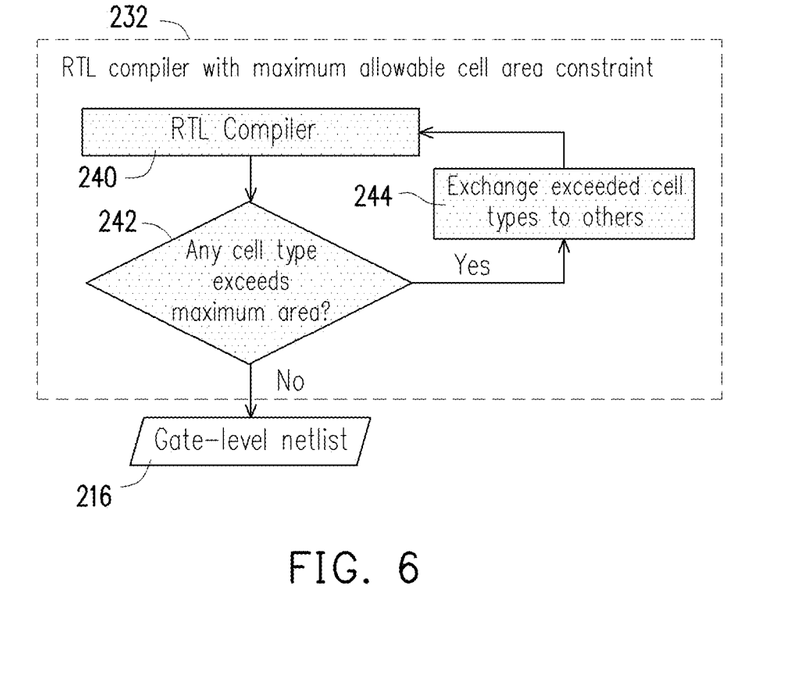
FIG. 6 is a block diagram illustrating further aspects of an integrated circuit design system in accordance with some embodiments.

FIG. 6 illustrates further aspects of an example of the RTL compiler 232, in which initial outputs of the compiling process 240 are checked to insure that no cell types $cell_{unit1-5}$ exceed the calculated maximum area for each cell type. In a decision block 242, if it is determined that any of the cell types $cell_{unit1-5}$ exceed the corresponding calculate maximum area $Area_{max}$(unit1-n), any such cell types $cell_{unit1-n}$ that exceed the maximum area are exchanged for another cell type, as shown in operation 244.

For example, the maximum allowable area $Area_{max}$(unit1) for the first cell type $cell_{unit1}$ having the first height $h_{unit1}$ is determined. Additionally, a total area for the first cells of the first cell type $cell_{unit1}$ specified by the design 202 is determined, and the total area of the plurality of first cells is compared with the maximum allowable area for the first cell type. If the total area of the plurality of first cells is greater than the maximum allowable area for the first cell type, then one of the first cells $cell_{unit1}$ is replaced with a second cell of the second cell type $cell_{unit2}$ that has a second height $height_{unit2}$ smaller than the first height $height_{unit1}$. The second cell is placed in the corresponding second row having the second row height $h_{unit2}$.

Once it is determined in the decision block 242 that none of the cell types $cell_{unit1-n}$ exceed the corresponding maximum area $Area_{max}$(unit1-n), the gate-level netlist 206 is generated. In this manner, the maximum allowable areas $Area_{max}$(unit1-n) for each row are not exceeded.

Figure 7:
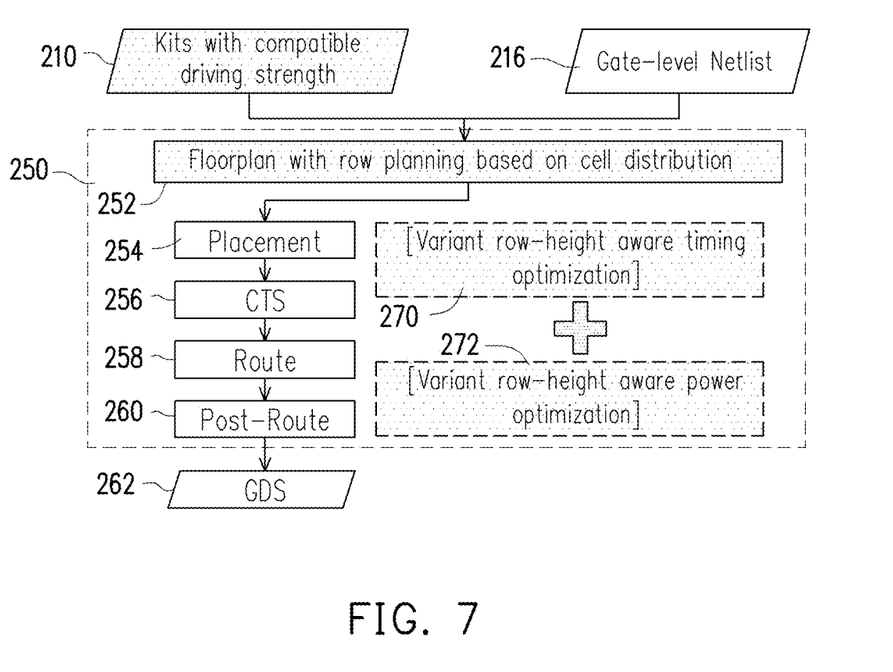
FIG. 7 is a block diagram illustrating further aspects of an integrated circuit design system in accordance with some embodiments.

Some examples include a physical design process in which the number of rows for each row height is determined based on the cell area as determined by the generated input netlist 206. FIG. 7 illustrates an example of such a physical design process, in which a cell kit or library 208 and gate-level netlist 206 are provided as inputs to an automatic placement and routing (APR) system 250. The APR system 250 is configured to determine a floorplan 252 including row planning based on cell distribution defined by the gate-level netlist 206.

Figure 8:
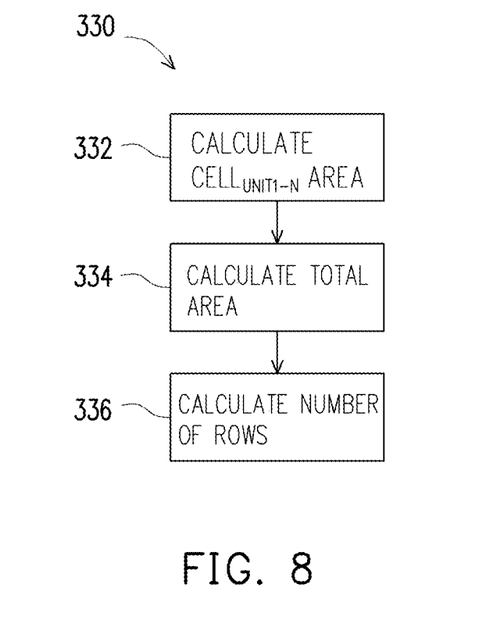
FIG. 8 is process flow diagram illustrating an example process for determining a number of rows for an integrated circuit floorplan in accordance with some embodiments, including.

Thus, in some examples, the number of rows required in the floorplan 252 is determined for each cell type $cell_{unit1-n}$. FIG. 8 illustrates a process 330 for determining the number of rows required for each cell type. In block 332, the area for each cell type $cell_{unit1-n}$ is determined, and the total cell area is determined in block 334. Based on the total cell area and the area for each cell type, the number of rows for each cell type is determined in block 336.

The total of the areas for each cell type is the total area $Area(Cell_{total})$ required for the floorplan. The number of rows required for each cell type (cell height) may be calculated as follows.

$$Row\#(uniti) = \frac{Area(Cell_{uniti})}{Area(Cell_{total})} \times \frac{1}{W_{core}} \times \frac{1}{h_{uniti}}$$

where Row#(uniti) is the number of rows required for the cell type having a height of uniti; $Area(Cell_{uniti})$ is the area of cell types having the unit height uniti; $W_{core}$ is the width of the design block; and $h_{uniti}$ is the height of uniti. The floorplan 252 with row planning is input to the remaining APR processes, including placement 254, clock tree synthesis (CTS) 256, routing 258, and post-routing 260. The APR 250 provides a graphic data system (GDS) output 262.

Figure 9:
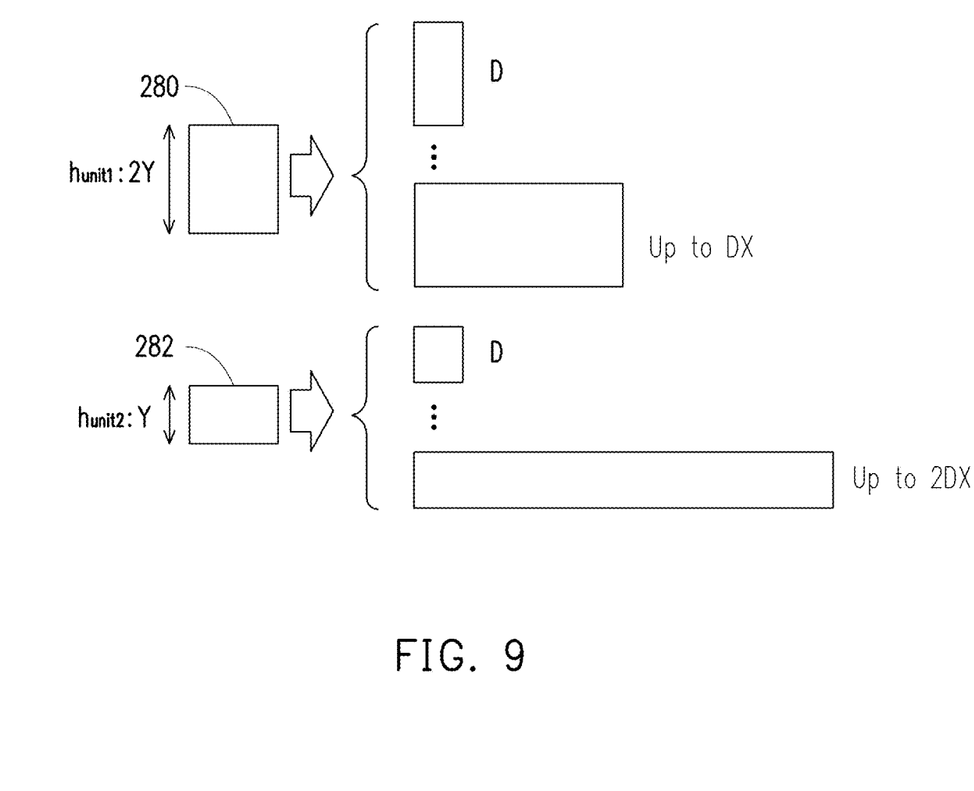
FIG. 9 is a block diagram illustrating further aspects of an integrated circuit design system, including driving strength considerations in accordance with some embodiments.

FIG. 9 illustrates an example of the driving strength optimization in which more driving strength is provided for rows with shorter cell heights. Referring to FIG. 7, in some examples, the cell library 208 includes drive strength information. The gate-level netlist 206 includes a specification of gates in the circuit and a specification of interconnections between the gates for the variant row height circuit design. Based on the library 208 and the gate-level netlist 206, drive strength information for specific gates in the circuit is determined and used to optimize driving strengths for different height cells. Thus, referring back to FIG. 9, for a taller cell 280 having a unit height $h_{unit1}$ of 2Y, driving strengths (D) of D up to DX (X is a driving strength multiplier) are used. For cells having a shorter height, driving strength is increased. For example, a shorter cell 282 having a unit height $h_{unit2}$ of Y (half the height of the taller cells 280), driving strengths of D up to 2DX are employed. In other words, in the illustrated example the maximum driving strength applied varies according to the cell unit height. In some embodiments the driving strength is inversely proportional to the cell unit height, and in other embodiments, the maximum driving strength may be provided based on the cell unit height having different relationships.

Figure 10:
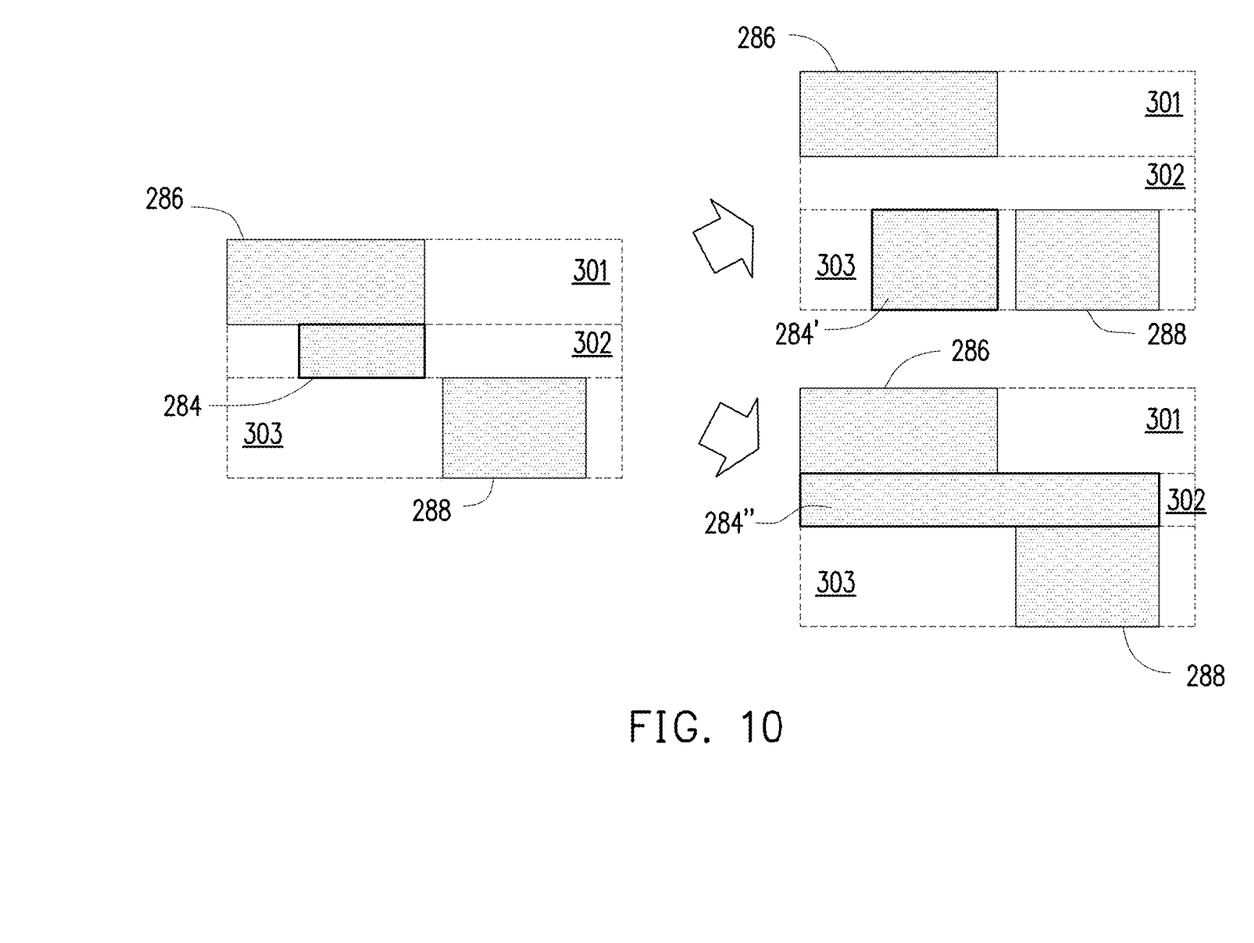
FIG. 10 is a block diagram illustrating further aspects of an integrated circuit design system, including timing optimization in accordance with some embodiments.

Returning to FIG. 7, in some examples the APR 250 includes variant row-height aware timing optimization 270 and/or variant row-height aware power optimization 272. FIG. 10 conceptually illustrates a variant row height timing optimization 270, where a design includes three rows 301-

303. The row 302 includes a timing-critical cell 284, and rows 301 and 303 include taller cells 286, 288. For example, the APR 250 may be configured to replace the cell 284 with a taller cell 284'. This cell 284' is the same unit height as the cell 288, and therefore, the cell 284' is placed in row 303 along with the cell 288. Alternatively, the timing-critical cell 284 is not exchanged for a taller cell, but instead the driving strength is upsized and/or voltage threshold is decreased, as indicated by the cell 284". Since the height of the cell 284" is not changed, it remains in row 302.

Figure 11:
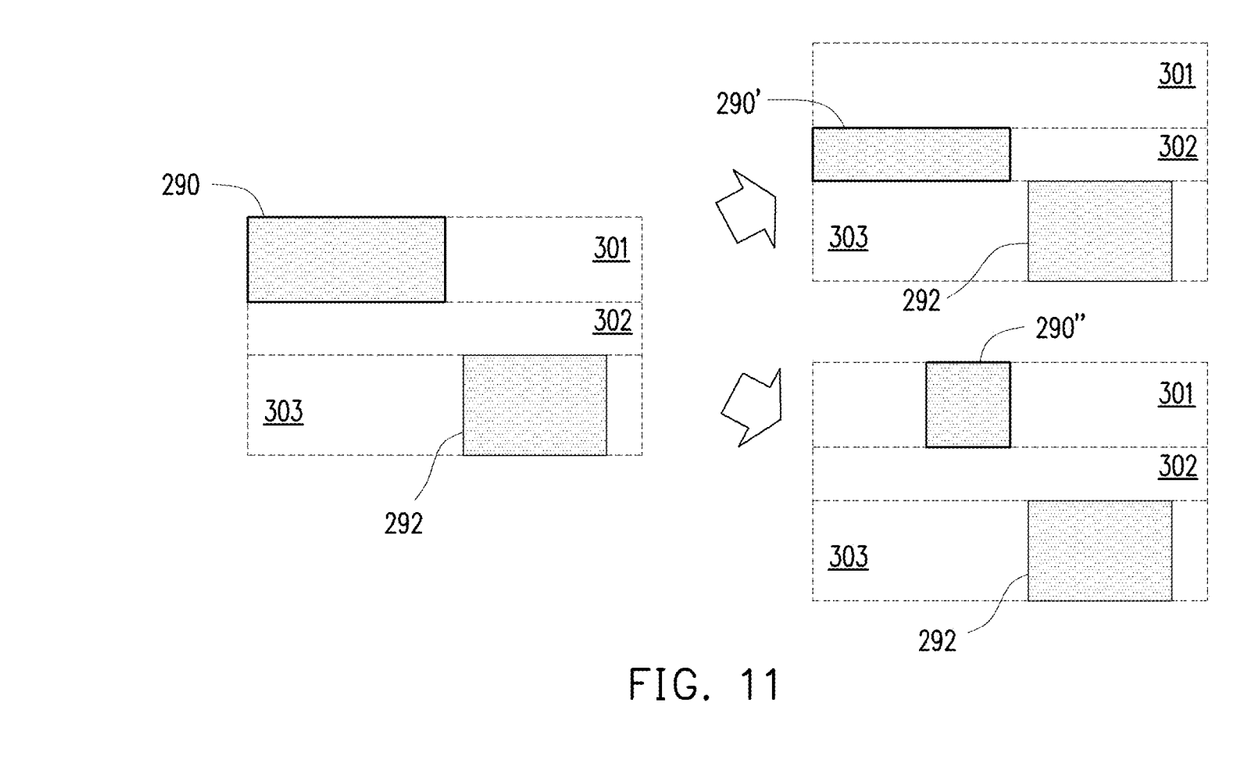
FIG. 11 is a block diagram illustrating further aspects of an integrated circuit design system, including power optimization in accordance with some embodiments.

FIG. 11 conceptually illustrates a variant row height power optimization 272, where a design includes a portion of a floorplan that has three rows 301-303. The row 301 includes a cell 290 which is to be optimized to reduce power. Another cell 292 is shown in row 303. For example, the APR 250 may be configured to replace the cell 290 with a shorter cell 290'. Accordingly, the shorter cell 290' would be placed in the shorter row height cell 302. Assuming there are no critical timing issues, the shorter height cell 290' would reduce power usage. Alternatively, the height of the cell 290 may be kept the same, but replaced by a cell 290" with altered driving strength and or voltage threshold to reduce power.

Thus, aspects of the present disclosure provide an integrated circuit design that has variant row heights for receiving corresponding variant height cells. By providing a design where cell heights match the height of the rows in which they are placed, total chip area is optimized and design area may be reduced. Resulting devices have less wasted area.

Disclosed embodiments thus include an integrated circuit that includes a first row having a first height, with a first cell in the first row that has the first height. The integrated circuit further includes a second row having a second height, where the first height is not an integer multiple of the second height. A second cell is in the second row that has the second height.

In accordance with further disclosed embodiments, a method of designing an integrated circuit includes receiving a functional integrated circuit design. A maximum allowable area for a first cell type having a first height is determined, and a total area for a plurality of first cells of the first cell type is determined. The total area of the plurality of first cells is compared with the maximum allowable area for the first cell type. If the total area of the plurality of first cells is greater than the maximum allowable area for the first cell type, then one of the first cells is replaced with a second cell of a second cell type having a second height smaller than the first height.

In accordance with still further disclosed embodiments, an integrated circuit design system includes a cell library with a first cell type having a first height and a second cell type having a second height. The first height is not an integer multiple of the second height. Computer readable media is accessible by a processor, and stores instructions that executed implement a method that includes receiving a functional integrated circuit design. A first cell of the first cell type and a second cell of the second cell type are selected from the cell library based on the functional integrated circuit design. An integrated circuit design layout is determined that includes a first row having the first height with the first cell located in the first row, and a second row having the second height with the second cell located in the second row.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of designing an integrated circuit, comprising:
receiving an integrated circuit design;
determining a first cell type having a first height for the integrated circuit design;
determining a maximum allowable area for the first cell type having the first height for the integrated circuit design;
determining a total area for a plurality of first cells of the first cell type for the integrated circuit design;
comparing the total area of the plurality of first cells with the maximum allowable area for the first cell type;
if the total area of the plurality of first cells is greater than the maximum allowable area for the first cell type, then replacing one of the first cells with a second cell of a second cell type having a second height smaller than the first height in the integrated circuit design;
wherein at least one step of the method is performed by a processor.

2. The method of claim 1, further comprising:
determining a floorplan for the integrated circuit design that includes a first row having the first height;
wherein the maximum allowable area for the first cell type having the first height is determined based on the floor plan; and
wherein the first row contains the plurality of the first cells.

3. The method of claim 2, wherein the floorplan includes a second row having the second height, and wherein the second row contains the second cell.

4. The method of claim 2, wherein the floorplan includes a plurality of the first rows.

5. The method of claim 4, further comprising determining a number of the plurality of the first rows based on a total cell area for the received integrated circuit design and the determined total area of the plurality of first cells.

6. The method of claim 2, further comprising generating a graphic data system (GDS) based on the floorplan.

7. The method of claim 6, wherein generating the GDS further includes changing the first cell type to another cell type having a different height based on a determined power consumption for the integrated circuit design.

8. The method of claim 6, wherein generating the GDS further includes changing the first cell type to another cell type having a different height based on a determined circuit timing for the integrated circuit design.

9. The method of claim 2, further comprising providing a cell library defining a plurality of the first cell types and a plurality of the second cell types.

10. The method of claim 9, wherein the cell library includes compatible driving strength information for the first and second cell types.

11. The method of claim 10, wherein the library defines driving strength levels for the first and second cell types based on the cell height of the first and second cell types.

12. A method, comprising:
defining a plurality of cells, each of the cells including components configured to perform a predefined function, the plurality of cells including a first cell type having a first height and a second cell type having a second height, wherein the first height is not an integer multiple of the second height;
storing the definitions of the plurality of cells in a cell library stored in a memory device accessible by a processor;
receiving an integrated circuit design by the processor;
selecting a first cell of the first cell type and a second cell of the second cell type from the cell library by the processor based on the received integrated circuit design;
generating an integrated circuit design layout by the processor including a first row having the first height with the first cell located in the first row, and a second row having the second height with the second cell located in the second row;
wherein the first row includes only cells having the first cell height, and the second row includes only cells having the second cell height.

13. The method of claim 12, wherein the first row has a plurality of the first cells, wherein the cell library includes a third cell type having a third height smaller than the first height, wherein the first height is not an integer multiplier of the third height, and wherein the method further comprises:
determining a maximum allowable area for the first row;
determining a total area of the plurality of the first cells;
comparing the total area of the plurality of the first cells with the maximum allowable area for the first row;
if the total area of the plurality of first cells is greater than the maximum allowable area for the first cell type, then replacing one of the first cells with one of the third cells, wherein the third cell is located in a third row having the third height.

14. The method of claim 13, wherein the method further comprises determining a floorplan including a plurality of the first rows.

15. The method of claim 14, further comprising determining the plurality of the first rows, including:
calculating a total cell area for the floorplan;
calculating a cell area for the plurality of the first cells; and
determining a number of the first rows based on the total cell area and the cell area for the plurality of the first cells.

16. The method of claim 12, further comprising storing compatible driving strength information for the first and second cell types in the library, including driving strength levels that vary based on the cell height.

17. The method of claim 12, further comprising:
determining power consumption for the integrated circuit design; and
changing the first cell to another cell type having a different height based on the determined power consumption for the integrated circuit design.

18. The method of claim 12, further comprising:
determining circuit timing for the integrated circuit design; and
changing the first cell to another cell type having a different height based on the determined circuit timing for the integrated circuit design.

19. A method, comprising:
storing definitions for a plurality of cells in a cell library stored in a memory device accessible by a processor, each of the cells including components configured to perform a predefined function;
receiving an integrated circuit design by the processor;
selecting a first type of cell of the plurality of cells by the processor based on the received integrated circuit design, the first type of cell having a first height;
determining a total area for a plurality of the first type of cells based on the received integrated circuit design;
locating the plurality of the first type of cells in a first row having a first height by the processor, the first cell having the first height;
comparing the total area of the plurality of first type of cells with a maximum allowable area for the first type of cell;
if the total area of the plurality of the first type of cells is greater than the maximum allowable area for the first type of cell, then replacing one of the first type of cells with a second cell of a second cell type having a second height smaller than the first height in the integrated circuit design;
locating the second one of the plurality of cells in a second row having the second height, wherein the first height is not an integer multiple of the second height.

20. The method of claim 19, further comprising
locating a third cell in a third row having a third height;
wherein the third cell has the third height, and wherein the third height is not an integer multiple of the first height or the second height.

* * * * *